United States Patent
Ornelas Gutierrez et al.

(10) Patent No.: US 8,987,165 B2
(45) Date of Patent: Mar. 24, 2015

(54) UNSUPPORTED AND SUPPORTED NON-PROMOTED RUTHENIUM SULFIDE CATALYST WITH HIGH CATALYTIC ACTIVITY FOR HYDROCARBON HYDROTREATMENTS AND ITS METHOD

(75) Inventors: Carlos Elias Ornelas Gutierrez, Chihuahua (MX); Lorena Alvarez Contreras, Chihuahua (MX); Jose Rurik Farias Mancilla, Chihuahua (MX); Alfredo Aguilar Elguezabal, Chihuahua (MX)

(73) Assignee: Centro de Investigacion en Materiales Avanzados, S.C., Chihuahua (MX)

( * ) Notice: Subject to any disclaimer, the term of this patent is extended or adjusted under 35 U.S.C. 154(b) by 344 days.

(21) Appl. No.: 13/444,411

(22) Filed: Apr. 11, 2012

(65) Prior Publication Data
US 2013/0153468 A1 Jun. 20, 2013

(30) Foreign Application Priority Data
Dec. 14, 2011 (MX) .................... MX/a/2011/013529

(51) Int. Cl.
*B01J 27/02* (2006.01)
*B01J 27/045* (2006.01)

(52) U.S. Cl.
USPC .......................................... 502/223; 502/216

(58) Field of Classification Search
USPC ................................................. 502/216, 223
See application file for complete search history.

(56) References Cited

U.S. PATENT DOCUMENTS

| | | | | |
|---|---|---|---|---|
| 3,055,840 A | * | 9/1962 | Koch, Jr. ...................... | 502/174 |
| 4,279,737 A | * | 7/1981 | Chianelli et al. .............. | 208/217 |
| 4,288,422 A | * | 9/1981 | Chianelli et al. .............. | 423/509 |
| 5,248,648 A | * | 9/1993 | Breysse et al. ................ | 502/223 |
| 5,997,840 A | | 12/1999 | Van Brussel | |
| 6,299,760 B1 | | 10/2001 | Soled | |
| 6,426,437 B1 | | 7/2002 | Shum | |
| 6,967,185 B2 | * | 11/2005 | Allen et al. ................... | 502/216 |
| 7,754,068 B2 | | 7/2010 | De Almeida | |
| 7,772,445 B2 | | 8/2010 | Chen | |
| 7,812,251 B2 | | 10/2010 | Islam | |
| 7,880,025 B2 | | 2/2011 | Touge | |

(Continued)

FOREIGN PATENT DOCUMENTS

JP 53-16686 * 2/1978 ............. G01N 21/22

OTHER PUBLICATIONS

Pecoraro T. A., Chianelli R.R., 1981. "Hydrodesulfurization Catalysis by transition Metal Sulfides". Journal of Catalysis, 67 Issue 2, pp. 430-445.

(Continued)

*Primary Examiner* — Patricia L Hailey
(74) *Attorney, Agent, or Firm* — Defillo & Associates, Inc.; Evelyn A. Defillo

(57) ABSTRACT

The present invention relates to a synthesis method for unsupported and supported ruthenium base (RuS2) catalysts from a ruthenium complex precursor, which is decomposed and activated by a simple activation process; these steps provide a catalyst with very high catalytic activity, in addition the incorporation of ruthenium complex precursor to a support by methods of incipient and wet impregnating is described; the obtained catalytic activities in this invention are in the order of 100 times the molybdenum sulfide catalyst without support and without promoter, 14 times the industrial supported catalyst, and 5 times the activity of the currently most active commercial unsupported catalyst.

10 Claims, 10 Drawing Sheets

(56) References Cited

U.S. PATENT DOCUMENTS

| | | | |
|---|---|---|---|
| 7,893,290 B1 | 2/2011 | Schapp | |
| 7,928,257 B2 | 4/2011 | Katsuki | |
| 7,932,411 B2 | 4/2011 | Touge | |
| 8,372,775 B2 * | 2/2013 | Gulla et al. | 502/185 |
| 2010/0167915 A1 | 7/2010 | Mohajeri | |
| 2010/0193402 A1 | 8/2010 | Li | |
| 2010/0292486 A1 | 11/2010 | Hoveyda | |

OTHER PUBLICATIONS

Shafi R., Hutchings G. J., 2000. "Hydrodesulfurization of hindered dibenzothiophenes: an overview." Catalysis Today, 59 pp. 423-442.

Grange P, Vanhaeren X., 1997. "Hydrotreating catalysis, an old story with new challenges." Catalysis Today, 36, pp. 375-391.

Chianelli R. R., Berhault g., Raybaud P., Kasztelan S., Hafner J., H. Toulhoat, 2002. "Periodic trends in hydrodesulfurization: in support of the Sabatier principle". Applied Catalysis A: General, 227, pp. 83-96.

Chianelli R. R., Berhault G., B. Torres, 2009. "Unsupported transition metal sulfide catalysis: 100 years of science and application". Catalysis Today, 147, pp. 275-286.

Song C., 2003. An overview of new approaches to deep desulfurization for ultra clean gasoline, diesel fuel and jet fuel. Catalysis Today, 86, pp. 211-263.

L. Alvarez, J. Espino, C. Ornelas, J.L. Rico, M.T. Cortez, G. Berhault, G. Alonso; "Comparative study of MoS2 and Co/MoS2 catalysts prepared by ex- situ/in situ activation of ammonium and tetraalkylammonium thiomolybdates"; Journal of Molecular Catalysis A: Chemical 210 (2004) 105-117.

* cited by examiner

UNSUPPORTED AND SUPPORTED NON-PROMOTED RUTHENIUM SULFIDE CATALYST WITH HIGH CATALYTIC ACTIVITY FOR HYDROCARBON HYDROTREATMENTS AND ITS METHOD

OBJECTIVE OF THE INVENTION

The present invention relates to a simple method for the synthesis of a ruthenium-based precursor complex, as well as the subsequent application of the ruthenium-based complex for obtaining both unsupported and supported ruthenium sulfide ($RuS_2$) catalysts. The precursor complex is obtained from the chemical reaction between ruthenium chloride and ammonium chloride. The obtained catalysts exhibit high catalytic activity in hydrotreatment reactions or hydroprocessing (HDT), mainly hydrodesulfurization (HDS), hydrodenitrogenation and hydrodeoxigenation of hydrocarbons.

The impact of the present invention for its application in the commercial area, reside in the high catalytic activity of the obtained catalysts, superior to the existing commercial catalysts, as well as the simplicity of the synthesis method, which will affect the quality of the obtained products in the industry, allowing to concur with the environmental standards imposed by current legislation.

BACKGROUND

Due to the high demand for hydrocarbons, the quality of the petroleum extracted worldwide has declined with the passage of time, since the hydrocarbons considered of high quality known as light crude oils, characterized by its greater amount of gasoline, low resin and low sulphur become limited, increasing the need for using the deposits of heavy crude oils that are distinguished by a greater proportion of undesirable components, such as sulfur, nitrogen, oxygen and metals, which produce greater amounts of pollutants and complicate the refining process.

In addition, the great technological and environmental problems generated by the presence of sulphur in the hydrocarbons combustion, have required current laws of developed countries to demand for low sulphur content in fuels such as gasoline and diesel, reducing the permitted sulphur content dramatically in a few years, reaching levels of 10 ppm in 2010.

The legislation to regulate the sulphur content allowed in fuels, together with the raw material processing of increasingly lower quality, has generated great difficulties in the hydrotreatment processes, wherein current catalysts have not been able to meet the strict requirements, being unable to treat more refractory molecules and as a result it is practically impossible for these to reach the imposed laws; consequently the need for the use of catalysts with optimized properties or new more active and selective catalysts are currently the greater challenge.

The hydroprocessing or hydrotreatment (HDT) processes, encompassed in the petroleum refining industry, wherein usually the separation of the highest proportion of contaminants is carried, have been using transition metal sulfides catalysts. More specifically, for a long period of time molybdenum has been the material in which the investigation of HDT has been focused. Currently, the science for the HDT catalysts and more specifically for hydrodesulfurization (HDS), has advanced a lot for the understanding of molybdenum based catalysts. Thus, emerging bimetallic catalysts, trimetallic catalysts, and the last generation of unsupported catalysts called NEBULA, with very complex synthesis processes but which offer considerable advantages over their predecessors. However, the exhaustive removal of heteroatoms in heavy fractions of petroleum remains a challenge, since it has been found that conventional catalysts for HDT are not sufficiently effective for this purpose.

In studies conducted by Pecoraro T. A., Chianelli R. R., 1981. Journal of Catalysis, 67 Issue 2, pp. 430-445; Shafia R., Hutchings G. J., 2000. Catalysis Today, 59 pp. 423-442; Grange P., Vanhaeren X., 1997. Catalysis Today, 36, pp. 375-391; Chianelli R. R., Berhault g., Raybaud P., Kasztelan S., Hafner J., H. Toulhoat, 2002. Applied Catalysis A: General, 227, pp. 83-96 and Chianelli R. R., Berhault G., B. Torres, 2009. Catalysis Today, 147, pp. 275-286, have show that unsupported ruthenium sulfide is a material that presents high activity, surpassing the traditional molybdenum sulfide catalyst and making it an excellent candidate to meet current requirements.

It is well known that the catalytic properties of a material depend greatly from its synthesis, as in the case of the catalysts called STARS, where an appropriate impregnation method allows a considerable improvement in the catalytic activity of the material (Song C., 2003. An overview of new approaches to deep desulfurization for ultra clean gasoline, diesel fuel and jet fuel. Catalysis Today, 86, pp. 211-263). It is why the features of the catalyst are of vital importance for their performance in the catalysts; thus, catalysts with low crystallinity (greater amount of defects which are usually active sites), high surface area (most exposed active sites) usually affect the catalytic activity of the material, resulting in materials being catalytically more active. These characteristics are obtained in the material synthesis; it is for this reason that starting from an appropriate precursor and with an appropriate decomposition/activation method, it is possible to generate a sulfide ruthenium catalyst with high catalytic activity.

The best catalysts in the HDS at the end of XX century were catalysts of sulfide of cobalt and molybdenum supported in alumina commonly known as CoMo/Alumina; nevertheless, Exxon Mobil-Albernate reported a new generation of commercial catalysts called STARS (Sites of Super Active Reaction Type II) which are catalysts of CoMo/Alumina and NiMo/Alumina, that are synthesized using a new alumina support base and a special technique of incorporation of the promoter (Co or Ni) which allows a very great and uniform dispersion of the metals in the support with moderate density. This catalysts family quickly exceeded the traditional CoMo/Alumina catalysts due to their capacity of sulphur removal especially steric hindered molecules (Song C., 2003. An overview of new approaches to deep desulfurization for gasoline, diesel engine fuel and jet fuel. Catalysis Today, 86, pp. 211-263). Subsequent to this great advance in the catalysts synthesis technology, at the beginning of this decade Exxon Mobil-Albemarle showed a similar development to the obtained by the STARS catalysts which were obtained thanks to the new catalyst called NEBULA (New Bulk Activity), which is a unsupported catalyst of NiCoMo without the use of a support, that allows a high performance in the quality of products like low sulphur content, high cetane, low density, etc. (Soled, Stuart L., Miseo, Sabato, Krycak, Roman, Vroman, Hilda, Ho, Teh C., Riley, Kenneth L., 2001. Nickel molybodtungstate hydrotreating catalysts (law444). U.S. Pat. No. 6,299,760; Meijburg G., 2001. Production of Ultra-low-sulfur Diesel in Hydrocracking with the Latest and Future Generation Catalysts. Catalyst Courier, 46, Akzo Nobel; Song C., 2003. An overview of new approaches to deep desulfurization for ultra-clean gasoline, diesel engine fuel and jet fuel. Catalysis Today, 86, pp. 211-263).

In summary, due to the legal requirements, technological and environmental, which reduce more and more the level of fuel emissions mainly allowed in combustibles, the generation of a more efficient catalytic system in HDS is the challenge. Currently, the catalysts used at the industrial level are based on molybdenum, supported and promoted by one or more transition metals (TM). Considering these regulations and the characteristics of the present catalysts, it becomes evident that the development of a new catalysts family with high catalytic activity is necessary. The most direct option is with the synthesis of ruthenium based catalysts. In this sense, a catalyst that offers high catalytic activity with a simple synthesis method may be the solution to the problems faced by the petrochemical industry.

Complex ruthenium precursors and other metals have been successfully synthesized thanks to the facility that presents the metals to form complexes. Thus, different ruthenium complex compounds have been synthesized and patented such as:

The United States Patent Publication Application No. 20030045737 that shows the synthesis of ruthenocene, ruthenocene cyclopentadienyl or indenyl ruthenocene, from a cyclopentadienyl compound or indenil with ruthenium chloride III hydrated and magnesium dust.

The U.S. Pat. No. 7,893,290 that shows the synthesis of an organometallic complex with formula M(RPD)$_2$, where M is iron, ruthenium or osmium; R is hydrogen or an aryl group with 1 to 4 carbon atoms and PD is a cyclic or open chain of a dienyl system that forms a complex type sandwich. This precursor is used to make thin films.

U.S. Pat. No. 7,928,257 shows a method for the production of a ruthenium complex of formula (Ru(Salen)(CO) of very complex structure for optical uses.

U.S. Pat. No. 7,928,257 shows the synthesis of organometallic complexes of very complex structure with cyclic compounds, radical groups, nitrogen and ligands, these complexes types have important applications in electroluminescence devices.

U.S. Pat. No. 7,812,251 shows the synthesis of a transition metal complex of formula MLY$^1$, where M is a transition metal like ruthenium, L is binding of polypyridine and Y$^1$ is a functional group that can have more than 50 carbon atoms, nitrogen or oxygen. This complex has important uses in photovoltaic cells.

Also the ruthenium complexes have been used as catalytic and we found the following patent documents:

U.S. Pat. No. 7,880,025 shows a method to produce a ruthenium complex of formula [RuX$_2$(L$^1$)]$_2$ where X represents a halogen atom and L$^1$ represent an aromatic complex compound with 8 radical groups. With uses in catalysts for the hydrogenation process.

U.S. Pat. No. 7,932,411 shows a method to produce an ruthenium complex with formula [RuX$_2$(L$^2$)]n where X represents a halogen atom, L$^2$ represents an aromatic compound and n is a natural number of 2 or more. Starting from the reaction of [RuX$_2$(L$^1$)]$_2$ (U.S. Pat. No. 7,880,025) and L$^2$. This ruthenium complex is also applied for the catalytic process of hydrogenation.

U.S. Pat. No. 7,772,445 shows a process for the reduction of composed with double carbon oxygen bond from a complex ruthenium-aryl-aminophosphine complex in the presence of a base. The ruthenium compound follows formula [RuX(A)(PNH$_2$)]X where A is C$_{6-14}$ a aryl or heteroaryl or an aromatic group of substituted C$_{6-10}$, (PNH$_2$) represents an aminophosphine ligand of formula R$^3$R$^4$P-L-NH$^2$, where R$^3$, R$^4$ and L are radical complexes.

U.S. Pat. No. 6,426,437 shows a process to produce 1,4-butanediol with catalyst of rhodium complex, ruthenium complex and bidentate diphosphine ligand, wherein the ruthenium complex includes a ruthenium link to a ligand of the group of halides, hydrides, carbonyl, trialkyl or triaryl, phosphines, 2-4 alkanedionates and replaced and not replaced cyclopentadienyl.

U.S. Pat. No. 5,997,840 shows a method for the synthesis of a solid chiral catalyst of Zeolite BEA as support and a metal-binap complex. The complex can be of ruthenium or other metals and includes in a complex of 2,2'bis(diphenylphosphino)-1,1'-binaphthyl))-M(R) where R can be a enantiomer. Finding good activity for production of pure enantiomers.

United States Patent Application Publication No. 20100292486 shows an organometallic complex compound synthesis of ruthenium as highly active catalysts for ring-closing metathesis (RCM), rings-opening (ROM) and cross methateses (CM) reactions, these compounds are synthesized from monomeric molecules with ligands that contain substitute molecules as 1,3-dimesithyl-4,5-dihydroimidazol-2-ylidene and styrenyl to ether ligands.

U.S. Pat. No. 6,696,608 shows a process for the transference of hydrogen with a complex catalyst with transition metals of transition of the VIIIB.

United States Patent Application Publication No. 2010/0167915 shows a nanocatalyst synthesis for hydrodesulfuration where the support is a nano-structured porous carbonaceous compound, as: carbon nanotubes, carbon nano-fibers, carbon nanoporous, carbon nano-norn, carbon nano-tubes fibers, or any combination of them with at least a metal of VIIIB family and one of the 6B family and although never mentions to ruthenium, claims the VIIIB family.

United States Patent Application Publication No. 20100193402 shows the synthesis of a catalytic metal oxide composite, which is designed of at least a metal of group VIIIB and at least two metals of group VIB. Basically, they are trimetallic catalyst that claims the VIIIB family.

U.S. Pat. No. 7,754,068; the patent applications of the same country the 201000288494 and 20100230323 and WO2011014553 claim the use of catalysts of VIB and VIIIB families without mentioning the ruthenium.

In the present invention synthesizes a ruthenium complex compound to be used as a precursor for the synthesis of catalysts for the HDS of hydrocarbons.

Thus, the present invention from the commercial point of view represents great advantages for having a very simple synthesis method of the precursory ruthenium complex which will affect in the catalyst cost, which is decomposed and activated by a process and infrastructure typically used for the activation of conventional catalysts; these two simple steps provide a catalyst with very high catalytic activity that allows to reach the high imposed requirements.

The obtained catalytic activities in this invention are in the order of 100 times the molybdenum sulfide catalyst without support and without promoter (L. Alvarez, J. Espino, C. Ornelas, J. L. Rico, M. T. Cortez, G. Berhault, G. Alonso; "Comparative study of MoS$_2$ and Co/MoS$_2$ catalysts prepared by ex-situ/in situ activation of ammonium and tetraalkylammonium thiomolybdates"; Journal of Molecular Catalysis A: Chemical 210 (2004) 105-117); 14 times of the industrial catalyst and 5 times the activity of the current most active commercial unsupported catalyst as illustrates in FIG. 1.

DETAILED DESCRIPTION OF THE INVENTION

Figure 1:
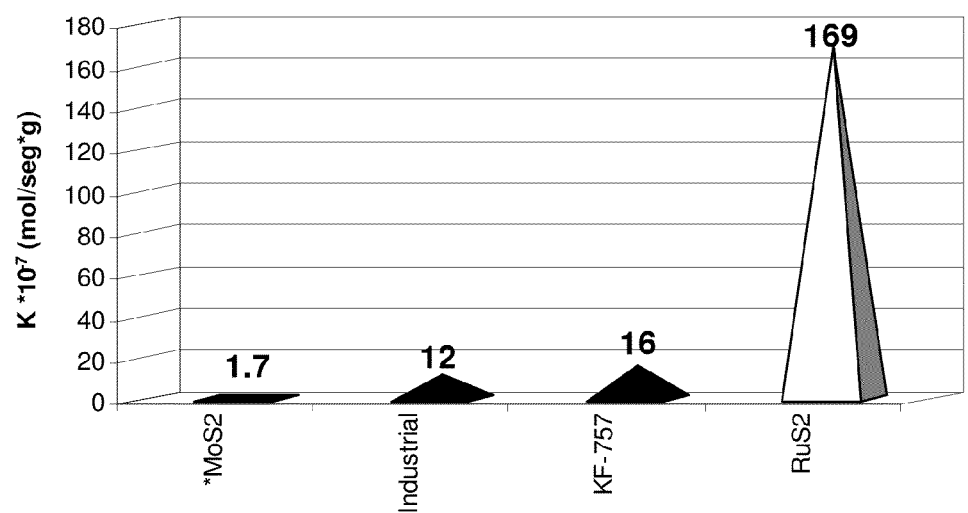
FIG. 1 shows a graph illustrating the catalytic activity of HDS of dibenzothiophen (DBT) of the MoS2 catalyst (taken from L Alvarez, J. Espino, C. Ornelas, J. L. Rico, T M. Cortes, G. Berhault, G. Alonso; "Comparative study of $MoS_2$ and $Co/MoS_2$ catalysts prepared by ex-situ/in situ activation of ammonium and tetraalkylammonium thiomolybdates"; Journal of Molecular Catalysis A: Chemical 210 (2004) 105-117), industrial catalyst NiMo/Alumina, industrial Catalyst KF 757 and one of the catalysts of $RuS_2$ proposed in this patent.

The present invention relates to a synthesis method of a family of ruthenium sulfide catalysts that starts with the synthesis of a family of ruthenium complex precursors of $RuN_xR_{4x}Cl_{3+Z}$ where X and Z can have values from 0 to 10 and the value depends on the conditions of the precursor synthesis.

The synthesis of the ruthenium sulfide catalysts ($RuS_2$) from the activation of the ruthenium complex with different activation conditions; allows to obtain unsupported catalysts this mean without support which active component is $RuS_2$ and supported where the component $RuS_2$ is placed on a support; not promoted, that is to say, without adding an additional metal, that exhibits high catalytic activity in hydrotreatment reactions or hydroprocessing (HDT), mainly hydrodesulfuration, hydrodenitrogenation and hydrodeoxigenation of hydrocarbons. The method includes a series of steps that starts from obtaining a family of ruthenium complex precursors with different activation conditions, which provides unsupported catalysts with a superficial area from 40 to 250 $m^2/g$ and a high amount of active sites.

For obtaining the family of ruthenium complex precursors and later the ruthenium sulfide catalysts the following steps are as follows:

dissolving hydrated ruthenium chloride in a solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination of these; where R1 is equal to OH, a lineal chain or branched radical C1 to C8, R2 is equal to H, a lineal chain or branched radical C1 to C8, with relation 0.01 to 40 ml of solvent per gram of salt preferably dissolved in methanol, ethanol or acetone.

dissolving ammonium chloride in solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination of these; where R1 is equal to OH, a lineal chain or branched radical C1 to C8, R2 is equal to H, a lineal chain or branched radical C1 to C8, with relation 0.01 to 40 ml of solvent per gram of salt preferably dissolved in water, methanol, ethanol, acetone or one combination of these.

adding the $NH_4Cl$ solution of b) in a molar relation of 1:1 to 10:1, preferably 3-6:1 molar to the ruthenium chloride solution of a), maintaining in mechanical agitation between 100 to 700 rpm during the addition and up to 30 minutes after this has finished.

adding $NH_4OH$ or HCl in proportion of 0.01 to 2 ml per gram of ruthenium chloride.

adding to the solution of step c) or d) according to the case, a R3COR4 or R3COOR5 compound, where R3 is a linear chain or branched radical C1 to C8, R4 is equal to H, or a linear chain or branched radical C1 to C8 and may include 1 or 2 oxygen atoms or 1 nitrogen atom, R5 is equal to a hydrogen radical or a linear chain or branched radical C1 to C10; preferably R3 is equal to a linear radical C1 to C2, R4 is equal to a radical H or to a linear radical C1 to C2 and R5 is equal to a radical H or to a linear radical C1 to C5, that may include 1 nitrogen atom or 2 oxygen atoms in relations of 0.5:1 to 20:1 in volume preferably 2-5:1 volume.

leaving to the solution of e) in mechanical agitation for 30 minutes between 100-700 rpm and resting from 0.1 to 3 hr to allow a suitable crystallization; a family of ruthenium complex compounds very soluble in water and sparingly soluble in acetone is produced and precipitated, these compounds have typical decomposition temperatures above 200° C. and total decomposition to metallic ruthenium in inert atmosphere to temperatures lower than 415° C. The precipitate is filtered and washed with acetone. Precursors with conversions between 28 and 99% are obtained, depending on the X and Z values in equation 1.

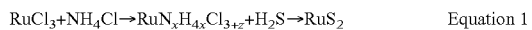

$$RuCl_3 + NH_4Cl \rightarrow RuN_xH_{4x}Cl_{3+z} + H_2S \rightarrow RuS_2 \qquad \text{Equation 1}$$

g) For the incorporation of the ruthenium complex to the support may be used the method of incipient impregnating or wet impregnating that comprises of placing a support bed that may be of $TiO_2$, zeolitic supports, mesostructured supports such as MCM-41, SBA-15, alumina, silice, mixed oxides or a combination thereof; doped or not doped. These supports also include the nanometric form of the same and are impregnated with a solution of the precursory complex in weight relation 1-90% of dissolved metallic charge in the minimum amount of solvent, the addition is carried out by dripping the solution to impregnate over the catalyst until filling all their porosity, incipient impregnating or moistening the catalyst, wet impregnating. For the impregnating the solvents used are R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof; where R1 is equal to OH, or a lineal chain or branched radical C1 to C8 and R2 is equal to H, or a lineal chain or branched radical C1 to C8, with relation 0.01 to 40 ml of solvent per gram of precursor, preferably dissolved in water, methanol, ethanol, acetone or one combination thereof.

h) The ruthenium precursor complex whether it is going to be used as unsupported catalytic (equation 1) or as supported (impregnated in a support) is decomposed and activated in one step. For this, temperatures are used from 350° C. to 550° C., preferably 400-450° C., with a heating rate from 2 to 50° C. per minute, preferably 2-10° C. per minute; under pressure of 1 atm, in a reducing atmosphere of a gas mixture formed by $H_2S/G$ where G may be $H_2$, $N_2$, Ar or He; in $H_2S$ concentrations from 2 to 99% preferably 2-15% or 80-99%. The synthesized catalyst is kept in an inert nitrogen atmosphere.

The catalysts are characterized by different techniques and to carry out the evaluation of its catalytic performance they were tested in the hydrodesulfurization reaction (HDS) using the dibenzothiophen model molecule (DBT). The catalyst was introduced in a batch reactor within the high pressure reactor model Parr 4520, with the solution of DBT and the cis and trans mixture of decahydronaphthalene (decaline). This hydrocarbon mixture, was prepared in concentrations of 5% DBT. The reactor was pressurized to 490 psi of $H_2$, warmed up from room temperature to 350° C. and with 600 rpm mechanical agitation. The advance of the reaction, was monitored by samples recollection in the liquid phase, taken from the reactor every 30 minutes throughout the reaction time; these samples are collected in small vials, which are analyzed by gas chromatography, in order to determine the constant of the speed reaction. The samples were analyzed in a Perkin-Elmer chromatograph model Auto System XL, equipped with packed column OV-17 3%. To these conditions, commercial catalysts were also tried.

The synthesized catalyst by this method will show a specific superficial area from 40 to 250 $m^2/g$ and low crystallization degree with crystals from 2 to 50 nm, mainly 2-10 nm. The analysis of the product by scanning electron microscopy or transmission electron microscopy show the morphology formation of nanometric particle agglomerates. The catalytic tests show results with respect to the selectivity and speed reaction constant in HDS of the DBT at the testing conditions in the order of 100 times the molybdenum sulfide catalyst without support and with promoter (Reference MoS2 taken from L. Alvarez, J. Hawthorn, C. Ornelas, J. L. Rico, M. T. Cortez, G. Berhault, G. Alonso; "Comparative study of $MoS_2$ and $Co/MoS_2$ catalysts prepared by ex-situ/in situ activation of ammonium and tetraalkylammonium thiomolybdates"; Journal of Molecular Catalysis A: Chemical 210 (2004) 105-117), 14 times the industrial supported catalyst and 5 times the activity of the currently more active commercial unsupported catalyst as shown in FIG. 1.

Table 1 shows the values of X and Z according to equation 1 for eight obtained ruthenium precursors complex with different conditions of synthesis, where acetone-water (S1) and methanol-water (S2) were used as solvents, with resting times of 0.1 hr (MI-1-) and 3 hr (MI-2-), with addition of $NH_4OH$ (MI-4-) and HCl (MI-3-) to the ammonium chloride reaction with ruthenium chloride. This is graphically shown in FIG. 2.

TABLE 1

|  | S1 | | S2 | |
|---|---|---|---|---|
|  | X | Z | X | Z |
| MI-1- | 2 | 2 | 7 | 7 |
| MI-2- | 3 | 3 | 8 | 8 |
| MI-3- | 2 | 2 | 8 | 8 |
| MI-4- | 1 | 0 | 6 | 6 |

EXAMPLES

Example 1

Method for the Synthesis of a Ruthenium Precursor Complex Using as Solvent Methanol for the Ruthenium Chloride and Water for Ammonium Chloride (S1)

Figure 2:
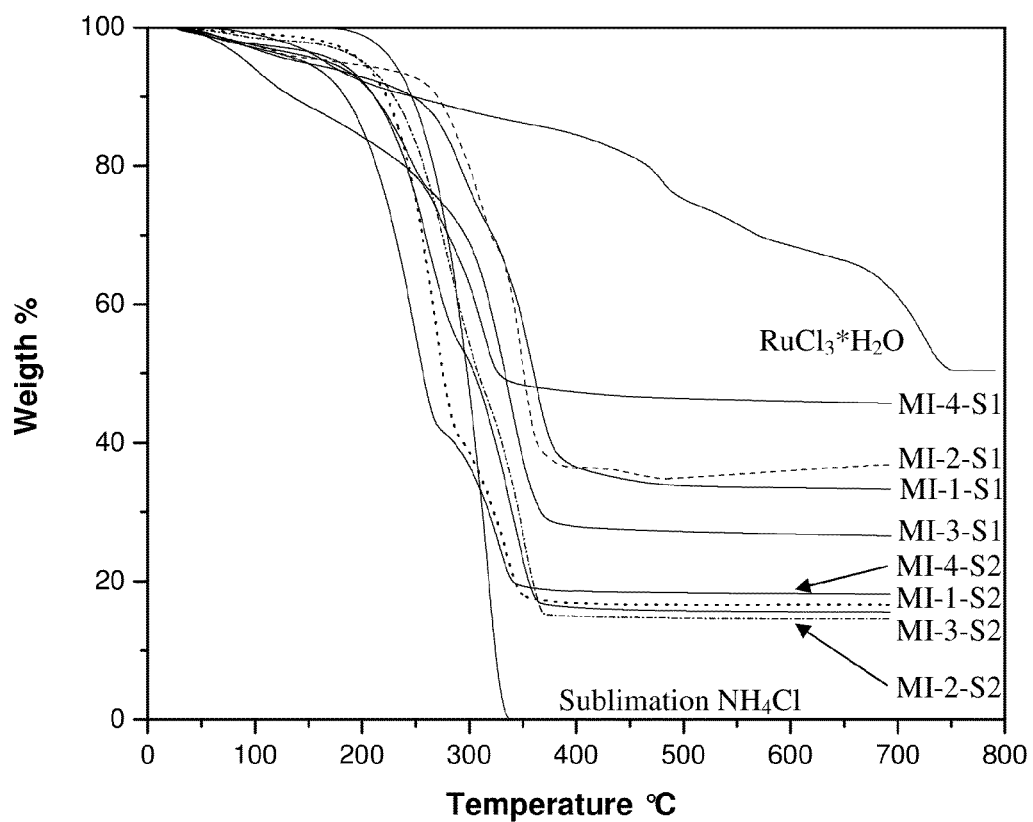
FIG. 2 shows a graph illustrating thermograms obtained by thermo-gravimetric analysis (TGA) of eight precursors of ruthenium complex obtained with different conditions of synthesis, where acetone-water (S1) and methanol-water (S2) were used as solvents, with resting times of 0.1 hr (MI-1-) and 3 hr (MI-2-), with addition of $NH_4OH$ (MI-4-) and HCl (MI-3-) to the reaction of ammonium chloride with ruthenium chloride.
Figure 3:
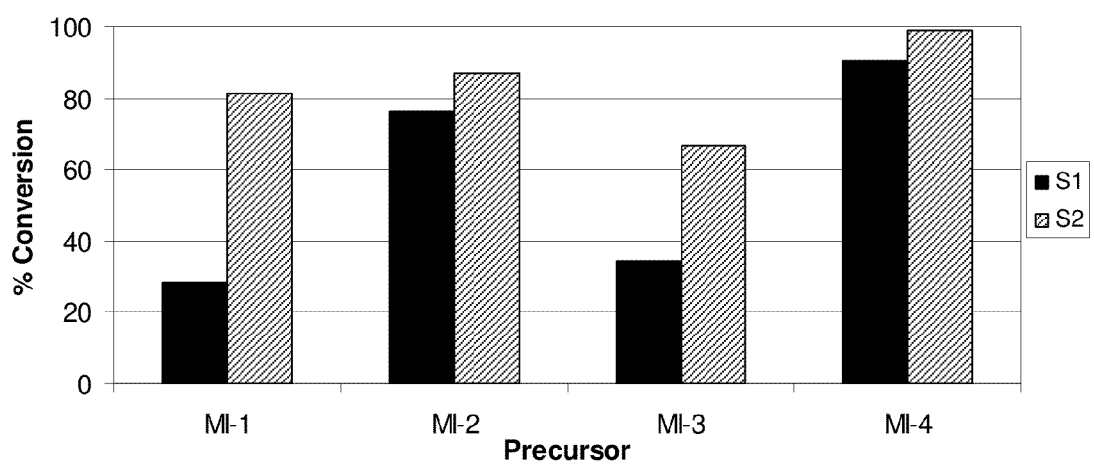
FIG. 3 shows a graph illustrating the conversion of the reaction of ruthenium chloride and ammonium chloride to a complex precursor according to equation 1, for eight ruthenium complex precursors obtained with different conditions of synthesis, where acetone-water (S1) and methanol-water (S2) were used as solvents, with resting times of rest of 0.1 hr (MI-1-) and 3 hr (MI-2-), with the addition of $NH_4OH$ (MI-4-) and HCl (MI-3-) from the reaction of ammonium chloride with ruthenium chloride.
Figure 4:
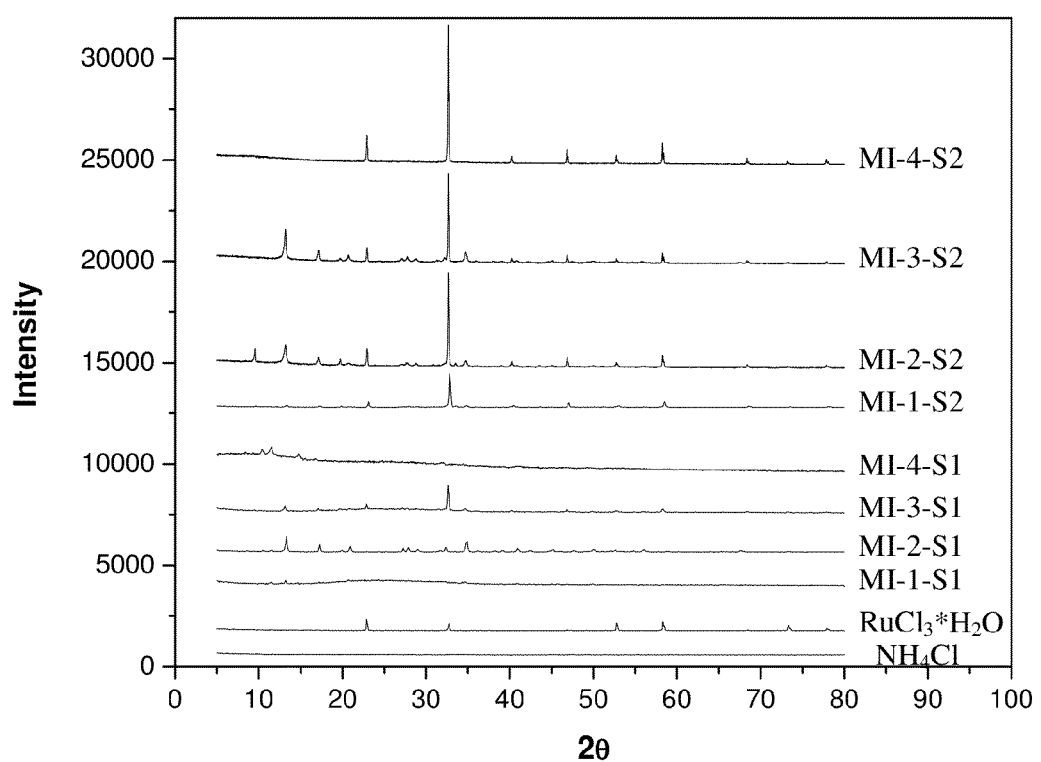
FIG. 4 show a graph illustrating X-ray diffraction patterns (XRD) of the obtained precursors by eight ruthenium complex precursors obtained by different synthesis conditions, where acetone-water (S1) and methanol-water (S2) were used as solvents, with resting times of 0.1 hr (MI-1-) and 3 hr (MI-2-), with addition of $NH_4OH$ (MI-4-) and HCl (MI-3-) from the reaction of ammonium chloride with ruthenium chloride.

In two beakers ruthenium chloride and ammonium chloride are dissolved separately, the ruthenium chloride is added to the ammonium chloride solution with constant mechanical agitation between 100 and 700 rpm, the solution is kept 30 minutes in constant mechanical agitation between 100 and 700 rpm and later acetone is added, the solution kept again in constant mechanical agitation between 100 and 700 rpm by another 30 minutes and 0.1 hours (nomenclature MI-1-S1) and 3 hours in rest (nomenclature MI-2-S1), later the precipitate is filtered and washed with acetone; the ruthenium presented in the final molecule is observed by thermogravimetric analysis (TGA) shown in FIG. 2, the ruthenium precursory complex in the form of dust of brown color have values of X and Z according to table 1 and equation 1, the precursors present different crystalline structures that are shown by X-ray diffraction (XRD) shown in FIG. 4 and reaction conversions according to FIG. 3.

Example 2

Synthesis Method for Ruthenium Precursory Complex Using as Solvent Methanol for the Ruthenium Chloride and Water for Ammonium Chloride (S1)

In two beakers, ruthenium chloride and ammonium chloride are dissolved separately, the ruthenium chloride is added to the ammonium chloride solution with constant mechanical agitation between 100 to 700 rpm, $NH_4OH$ (nomenclature MI-4-S1) or HCl (nomenclature MI-3-S1) are added, the solution is kept 30 minutes in constant mechanical agitation between 100 and 700 rpm and later acetone is added, the solution is kept again in constant mechanical agitation between 100 and 700 rpm by another 30 minutes and 3 hours in rest, later the precipitate is filtered and washed with acetone; the ruthenium presented in the final molecule is observed by thermogravimetric analysis (TGA) shown in FIG. 2, the ruthenium precursory complex in the form of dust of military green color (MI-3-S1) and black (MI-4-S1) have values of X and Z according to Table 1 and equation 1, the precursors present different crystalline structures that are shown by X-ray diffraction (XRD) shown in FIG. 4 and reaction conversions according to FIG. 3.

Example 3

Synthesis Method for Ruthenium Precursory Complex Using as Solvent Acetone for the Ruthenium Chloride and Acetone and Water for Ammonium Chloride (S2)

In two beakers, ruthenium chloride and ammonium chloride are dissolved separately, the ruthenium chloride is added to the ammonium chloride solution with constant mechanical agitation between 100 to 700 rpm, the solution is kept 30 minutes in constant mechanical agitation between 100 and 700 rpm and later acetone is added, the solution is kept again in constant mechanical agitation between 100 and 700 rpm by another 30 minutes and 0.1 hours (nomenclature MI-1-S2) and 3 hours in rest (nomenclature MI-2-S2), later the precipitate is filtered and washed with acetone; the ruthenium presented in the final molecule is observed by thermogravimetric analysis (TGA) shown in FIG. 2, the ruthenium precursory complex in the form of dust of green color have values of X and Z according to Table 1 and equation 1, the precursors present different crystalline structures that are shown by X-ray diffraction (XRD) shown in FIG. 4 and reaction conversions according to FIG. 3.

Example 4

Synthesis Method for Ruthenium Precursory Complex Using as Solvent Acetone for the Ruthenium Chloride and Acetone+Water for the Ammonium Chloride (S2)

In two beakers, ruthenium chloride and ammonium chloride are dissolved separately, the ruthenium chloride is added to the ammonium chloride solution with constant mechanical agitation between 100 to 700 rpm, $NH_4OH$ (nomenclature MI-4-S2) or HCl (nomenclature MI-3-S2) are added, the solution is kept 30 minutes in constant mechanical agitation between 100 and 700 rpm and later acetone is added, the solution is kept again in constant mechanical agitation between 100 and 700 rpm by another 30 minutes and 3 hours in rest, later the precipitate is filtered and washed with acetone; the ruthenium presented in the final molecule is observed by thermogravimetric analysis (TGA) shown in FIG. 2, the ruthenium precursory complex in the form of dust of brown color (MI-3-S2) and black (MI-4-S2) have values of X and Z according to Table 1 and equation 1, the precursors present different crystalline structures that are shown by X-ray diffraction (XRD) shown in FIG. 4 and reaction conversions according to FIG. 3.

Example 5

Synthesis Method for Unsupported Ruthenium Sulfide Catalysts Starting from the Ruthenium Precursory Complex MI-2-S2

Figure 5:
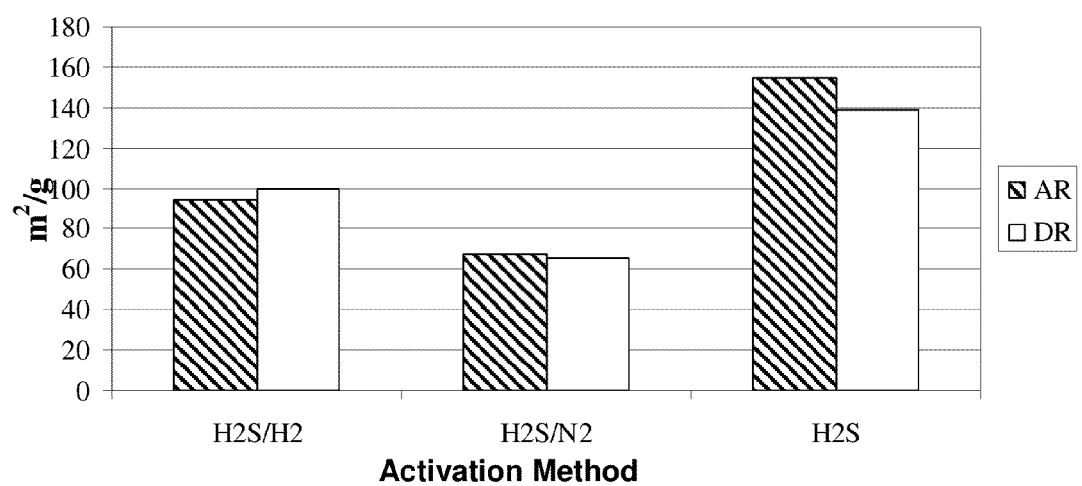
FIG. 5 shows a comparative graph of the superficial area before (AR) and after reaction (DR) of HDS of the DBT, the superficial area is measured using the method of Brunauer, Emmet and Teller (BET) in the synthesized catalysts from the decomposition of the ruthenium complex precursor with acetone-water (MI-2-S2) in controlled atmospheres of $H_2/H_2S$ (85:15% vol), $N_2/H_2S$ (85:15% vol) and $H_2S$.
Figure 6:
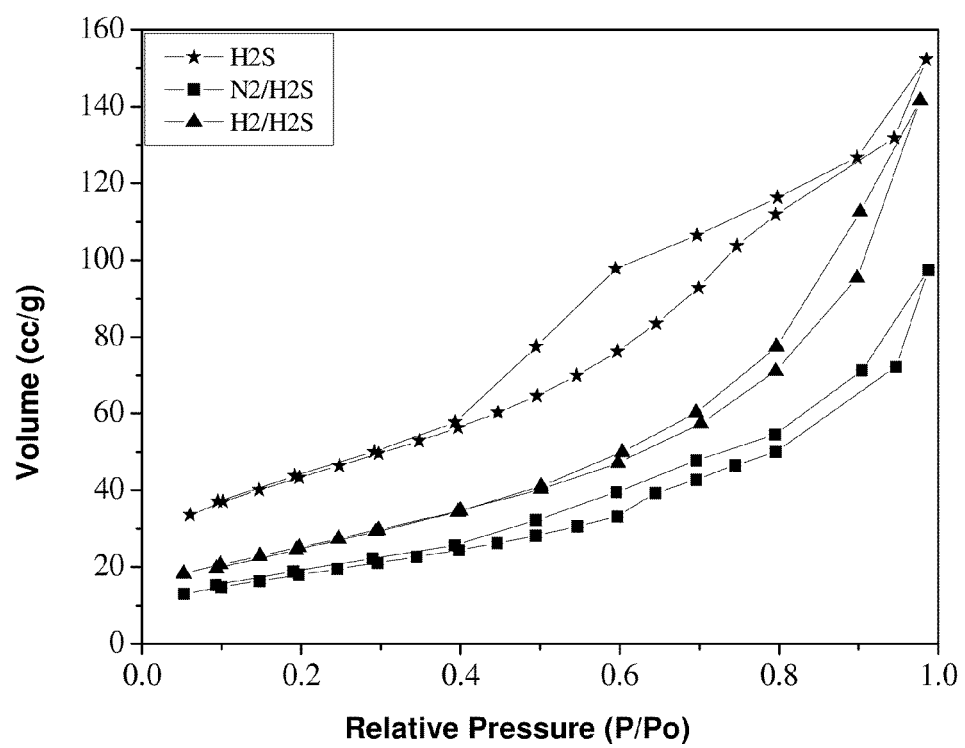
FIG. 6 shows a graph illustrating the adsorption isotherms of the synthesized catalysts from the decomposition of the ruthenium complex precursor with solvent acetone-water (MI-2-S2) in controlled atmospheres of $H_2/H_2S$ (85:15% vol), $N_2/H_2S$ (85:15% vol) and $H_2S$.
Figure 7:
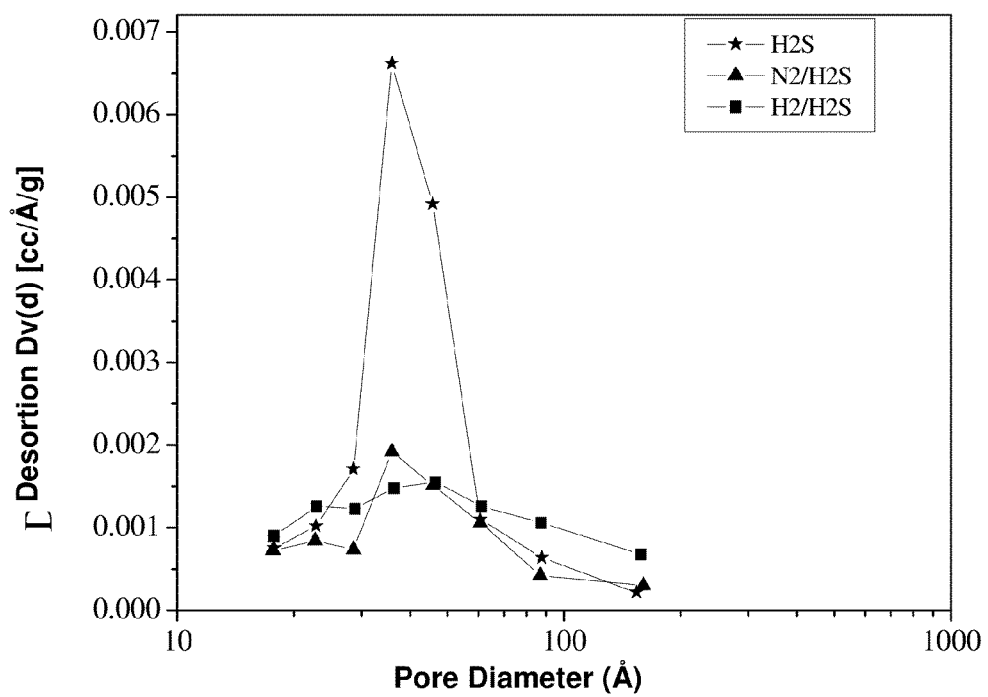
FIG. 7 shows a graph illustrating the pore distribution calculated by the method of Barrett, Joyner and Halenda (BJH) of the synthesized catalysts from the decomposition of the ruthenium complex precursor with solvent acetone-water (MI-2-S2) in controlled atmospheres of $H_2/H_2S$ (85:15% vol), $N_2/H_2S$ (85:15% vol) and $H_2S$.
Figure 8:
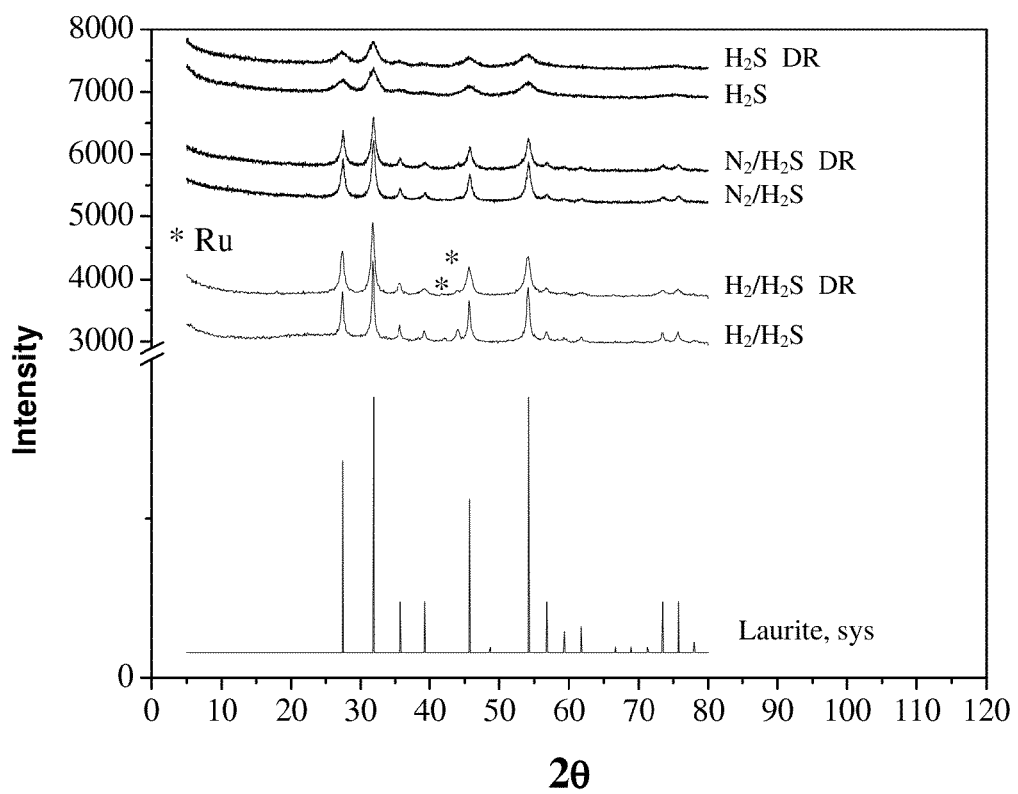
FIG. 8 shows a graph illustrating XRD diffraction patterns before and after the reaction (DR) of HDS of the DBT of the synthesized catalysts from the decomposition of ruthenium complex precursor with solvent acetone-water (MI-2-S2) in controlled atmospheres of $H_2/H_2S$ (85:15% vol), $N_2/H_2S$ (85:15% vol) and $H_2S$.
Figure 9:
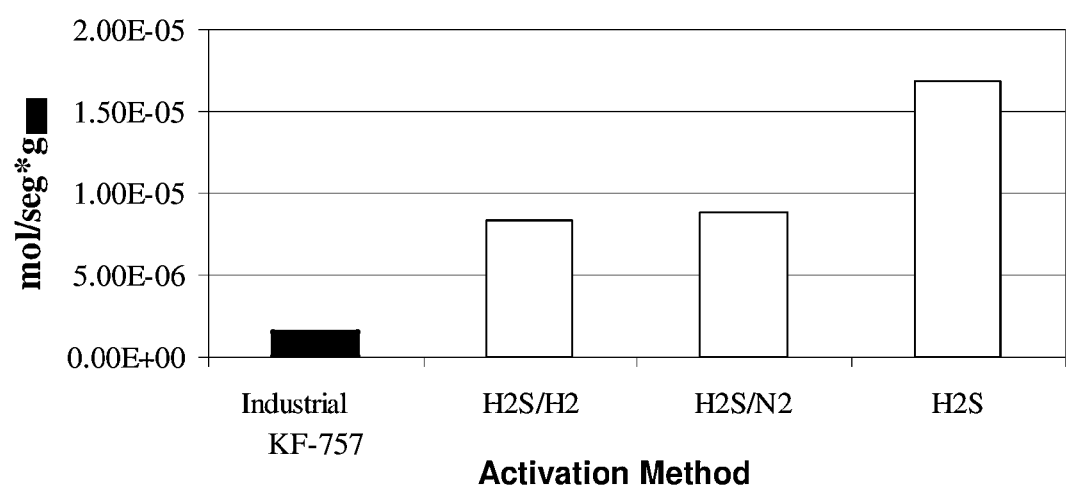
FIG. 9 shows a graph illustrating the catalytic activity measurements of the reaction of HDS of the DBT of the synthesized catalysts from the decomposition of the ruthenium complex precursor with solvent acetone-water (MI-2-S2) in controlled atmospheres of $H_2/H_2S$ (85:15% vol), $N_2/H_2S$ (85:15% vol) and $H_2S$.
Figure 10:
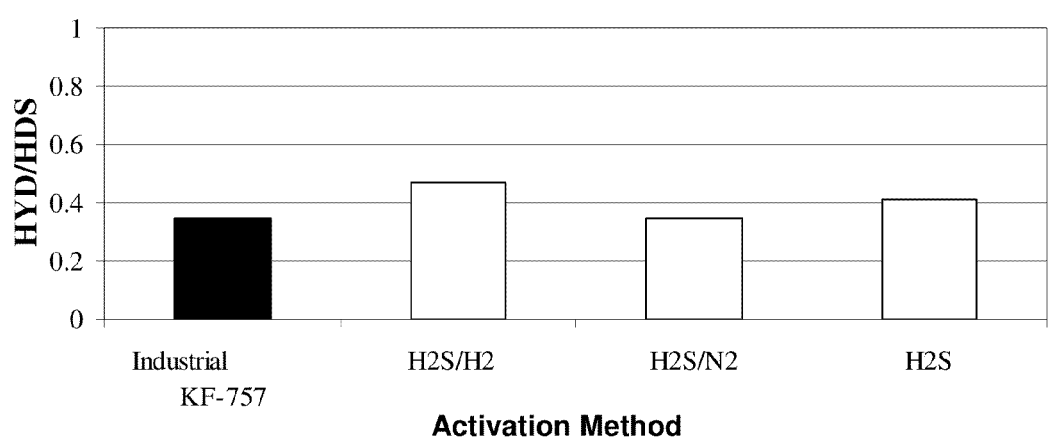
FIG. 10 shows a graph illustrating the selectivity in the catalytic activity measurements in the reaction of HDS of the dibenzothiophen (DBT) of the synthesized catalysts from the decomposition of the ruthenium complex precursor with solvent acetone-water (MI-2-S2) in controlled atmospheres of $H_2/H_2S$ (85:15% vol), $N_2/H_2S$ (85:15% vol) and $H_2S$.

The ruthenium precursory complex where acetone-water (MI-2-S2) solvent is used is decomposed and activated in a tubular furnace with a heating rate from 2 to 50° C. per minute, preferably 2-10° C. per minute; to 400° C. for 2 hours in a flow of $H_2/H_2S$ (85:15% vol), $N_2/H_2S$ (85:15% vol), and $H_2S$ and the catalytic activity is tested in the HDS of the DBT; FIG. 5 shows the superficial area measured using the method of Brunauer, Emmet and Teller (BET) before and after the reaction, the adsorption isotherms y and the pore distribution are shown in FIGS. 6 and 7 respectively. FIG. 8 shows the graph with the results of XRD of the catalysts. FIGS. 9 and 10 show the graphs of the catalytic evaluation and the selectivity respectively.

The invention claimed is:

1. A synthesis method for obtaining ruthenium sulfide ($RuS_2$) catalyst without an additional metal or not promoted comprising the steps of:
 a) dissolving hydrated ruthenium chloride in a solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof:
 wherein:
 R1 is equal to OH or a lineal chain or branched radical C1 to C8;
 R2 is equal to H, a lineal chain or branched radical C1 to C8, with relation 0.01 to 40 ml of solvent per gram of salt dissolved in methanol, ethanol or acetone;
 b) dissolving ammonium chloride in solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination of these;
 wherein:
 R1 is equal to OH or a lineal chain or branched radical C1 to C8;
 R2 is equal to H, a lineal chain or branched radical C1 to C8, with relation 0.01 to 40 ml of solvent per gram of salt dissolved in water, methanol, ethanol, acetone or combination thereof;
 c) adding the NH4Cl solution of b) in a molar relation of 1:1 to 10:1 to the ruthenium chloride solution of a), keeping in mechanical agitation between 100 to 700 rpm during the addition and up to 30 minutes after the addition has finished;
 d) adding $NH_4OH$ or HCl in proportion of 0.01 to 2 ml per gram of ruthenium chloride;
 e) adding to the solution of step c) or d) a R3COR4 or R3COOR5 compound,
 wherein
 R3 is a linear chain or branched radical C1 to C8,
 R4 is equal to H or a linear chain or branched radical C1 to C8 and includes 1 or 2 oxygen atoms or 1 nitrogen atom,
 R5 is equal to a hydrogen radical or a linear chain or branched radical C1 to C10;
 f) leaving to the solution of e) in mechanical agitation for 30 minutes between 100-700 rpm and resting from 0.1 to 3 hr to allow crystallization; a family of ruthenium complex compounds very soluble in water and sparingly soluble in acetone is produced and precipitated, the family of ruthenium complex compounds have decomposition temperatures above 200° C. and total decomposition to metallic ruthenium in inert atmosphere to temperatures lower than 415° C.; filtering and washing with acetone the precipitate;

g) incorporating the family of ruthenium complex compounds to a support by using a method selected from an incipient impregnating method or a wet impregnating method, wherein a support bed includes: $TiO_2$, zeolitic, MCM-41, SBA-15, alumina, silica, mixed oxides, or a combination thereof; doped or not doped, wherein the support is impregnated with a solution of the precursory complex in weight relation 1-90% of dissolved metallic charge in the minimum amount of solvent, wherein during the impregnation the solution of the ruthenium complex compounds is drip over the catalyst until filling all porosity; and h) decomposing and activating the ruthenium precursor complex at temperatures between 350° C. to 550° C. with a heating rate from 2 to 50° C. per minute under pressure of 1 atm, in a reducing atmosphere of a gas mixture formed by $H_2S/G$ where G may be $H_2$, $N_2$, Ar or He; in $H_2S$ concentrations from 2 to 99%.

2. The synthesis method according to claim 1, wherein the method is carried out according to the following equation:

$$RuCl_3+NH_4Cl \rightarrow RuN_xH_{4x}Cl_{3+z}+H_2S \rightarrow RuS_2.$$

3. The synthesis method according to claim 1, wherein the impregnation step uses a solvent selected from the group consisting of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof;
wherein
R1 is equal to OH, or a lineal chain or branched radical C1 to C8,
R2 is equal to H, or a lineal chain or branched radical C1 to C8, with relation 0.01 to 40 ml of solvent per gram of precursor dissolved in water, methanol, ethanol, acetone or one combination thereof.

4. The synthesis method according to claim 1, wherein:
R3 is equal to a linear radical C1 to C2,
R4 is equal to a radical H or to a linear radical C1 to C2, and
R5 is equal to a radical H or to a linear radical C1 to C5 including 1 nitrogen atom or 2 oxygen atoms in relation of 0.5:1 to 20:1 in volume.

5. The synthesis method according to claim 1, wherein the ruthenium complex compounds have conversions between 28 and 99%.

6. The synthesis method according to claim 1, wherein the ruthenium sulfide precursor is decomposed and is activated by the passage of h).

7. The synthesis method according to claim 1, wherein the method provides unsupported and supported catalysts.

8. The synthesis method according to claim 1, wherein the catalyst is incorporated to the support after step g.

9. A method of making a ruthenium sulfide catalyst not promoted, comprising:
mixing:
$RuCl_3$ dissolved in a solution of R1COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination thereof prior to being mixed with the $NH_4Cl$ wherein R1 is equal to OH or a lineal chain or branched radical C1 to C8, R2 is equal to H, a lineal chain or branched radical C1 to C8, with relation 0.01 to 40 ml of solvent per gram of salt dissolved in methanol, ethanol or acetone;
$NH_4Cl$ dissolved in a solution of R1 COR2, R2-OH, $C_4H_8O$ (THF), $C_4H_8O_2$, $CH_2Cl_2$ (DCM), $C_2H_3N$ (MeCN), $C_3H_7ON$ (DMF), $C_2H_6SO$ (DMSO) or a combination of these prior to being mixed with the $RuCl_3$, R1 is equal to OH or a lineal chain or branched radical C1 to C8, R2 is equal to H, a lineal chain or branched radical C1 to C8, with relation 0.01 to 40 ml of solvent per gram of salt dissolved in water, methanol, ethanol, acetone or combination thereof;
$NH_4OH$ or HCl; and
R3COR4 or R3COOR5, R3 is a linear chain or branched radical C1 to C8, R4 is equal to H or a linear chain or branched radical C1 to C8 and includes 1 or 2 oxygen atoms or 1 nitrogen atom, and R5 is equal to a hydrogen radical or a linear chain or branched radical C1 to C10;
the ruthenium sulfide catalyst is made by the following reaction:

$$RuCl_3+NH_4Cl \rightarrow RuN_xH_{4x}Cl_{3+z}+H_2S \rightarrow RuS_2$$

wherein X and Z have values from 0 to 10;
the ruthenium sulfide catalyst is soluble in water and sparingly soluble in acetone;
the ruthenium sulfide catalyst has a decomposition temperature above 200° C. and a total decomposition to metallic ruthenium in an inert atmosphere to temperatures lower than 415° C.

10. The method of making the ruthenium sulfide catalyst catalysts according to claim 9, wherein the ruthenium sulfide catalyst is an unsupported catalyst with a superficial area from 40 to 250 $m^2/g$ and crystals sizes of 2 to 50 nanometers.

* * * * *